Figure 1:
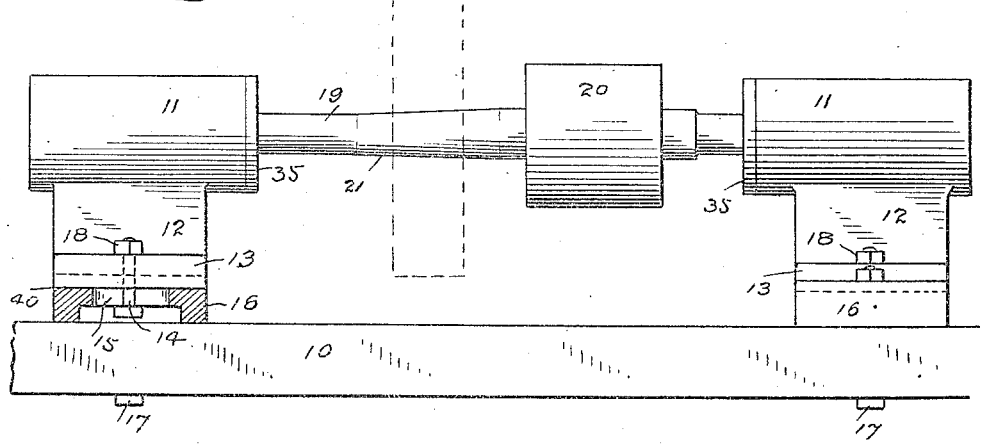

H. V. SMITH.
ROLLER BEARING.
APPLICATION FILED JAN. 11, 1909.

936,485.

Patented Oct. 12, 1909.

Witnesses:
H. A. Lamb
S. W. Atherton

Inventor
Henry V. Smith
By Attorney
H. M. Wooster

UNITED STATES PATENT OFFICE.

HENRY V. SMITH, OF BRIDGEPORT, CONNECTICUT, ASSIGNOR OF ONE-HALF TO EUGENE H. H. SMITH, OF BRIDGEPORT, CONNECTICUT.

ROLLER-BEARING.

936,485.

Specification of Letters Patent.   Patented Oct. 12, 1909.

Application filed January 11, 1909.   Serial No. 471,564.

*To all whom it may concern:*

Be it known that I, HENRY V. SMITH, a citizen of the United States, residing at Bridgeport, county of Fairfield, State of Connecticut, have invented a new and useful Roller-Bearing, of which the following is a specification.

This invention has for its object to provide a polishing frame, so called, which shall be simple and inexpensive to produce, durable, light running, self-centering and self-adjusting to compensate for wear. Heretofore in this class of machines, the spindle has run in stationary puppet heads and the loss of time in adjusting and centering the spindle and the wear upon spindles and puppet heads have been serious items of expense in the running and maintenance of the machines.

In my present machine, emery and dust are effectually excluded from the bearings, the spindle is easily set in place and the use of tools is done away with other than a wrench for tightening up a longitudinally movable bearing head.

Figure 2:
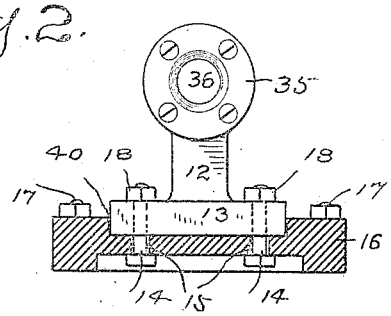
Figure 3:
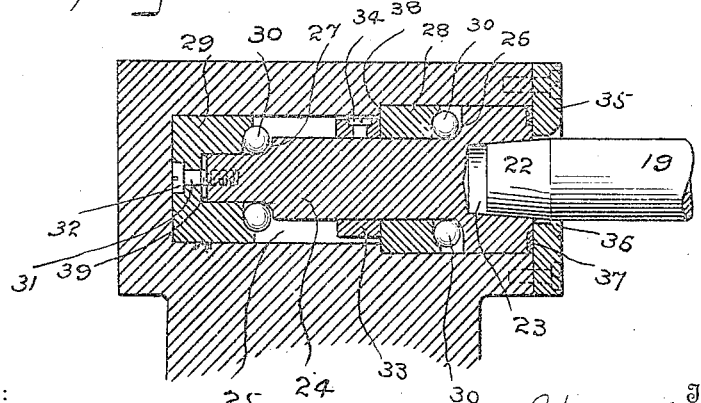

In order to produce a machine which shall do away with the objections heretofore existing to this class of machines, and while admirably adapted to all classes of work and all classes of workmen, shall be especially adapted for use by unskilled workmen on account of its perfect simplicity and the fact that it is self-adjusting, I have devised the novel polishing frame of which the following description in connection with the accompanying drawing is a specification, reference characters being used to indicate the several parts:

Figure 1 is a side elevation of my novel machine complete, the base of one of the bearing heads being in transverse section; Fig. 2 a cross section of the bed with one of the bearing heads in front elevation; and Fig. 3 is a longitudinal section on an enlarged scale of one of the bearing heads.

The essential feature of novelty of the present machine is that the spindle carriers revolve with the spindle.

10 denotes the bed, 11 the bearing heads complete, 12 standards by which the bearing heads are carried and 13 bases from which the standards extend. Either or both of the bearing heads are made longitudinally adjustable on the bed.

14 denotes bolts which pass through the bases and through slots 15 in blocks 16 which lie in recesses 40 and are rigidly secured to the bases by bolts 17. The bearing heads are locked in position after adjustment by means of nuts 18 on bolts 14.

19 denotes the spindle which is shown as provided with a belt pulley 20 and with a slightly tapering portion indicated by 21 (exaggerated in the drawing) which receives a grinding or polishing wheel, indicated by dotted lines in Fig. 1. Each end of the spindle is tapered as at 22 and engages a correspondingly tapering socket 23 in a spindle carrier 24.

The essential feature of the invention is that the spindle carriers rotate in suitable bearings and that they carry the spindle by frictional engagement therewith. I preferably use bearings of substantially the type illustrated in Fig. 3. Each spindle carrier with the parts which collectively comprise the bearing is received in a socket 25 in a bearing head 11. The spindle carrier is provided with shoulders 26 and 27 which serve as members of ball races. Corresponding with shoulder 26 is an outer block 28, through which the spindle passes, which bears against a shoulder 38 in socket 23 and the forward end of which comprises the other member of the outer ball race. Corresponding with shoulder 27 is an inner block 29 lying at the inner end of socket 23 and having a socket 39 to receive the inner end of the spindle and the forward end of which comprises the other member of the inner ball race. 30 denotes balls in the races. Block 29 is loosely secured to the inner end of the spindle, to prevent detachment therefrom when the bearing is removed, by means of a screw 31 having a head 32 loosely socketed in the block. Block 28 is held against detachment when the bearing is removed by means of a collar 33 which is secured in place by a set screw 34. The bearing complete, that is the spindle carrier and the blocks, is retained in the socket by means of a ring 35 shown as secured in position by screws. At the center of the retaining ring is an opening 36 through which the end of the spindle may be passed freely. 37 denotes a packing ring which is recessed into the outer end of the spindle carrier and is wholly covered by ring 35. This construction renders it impossible for emery or dust to enter the bearing.

The operation will be readily understood from the drawing. To insert or remove a spindle, it is simply necessary to loosen one of the bases and move the corresponding standard and bearing head longitudinally outward far enough to permit the spindle to be inserted or removed. Having placed one end of the spindle in the socket in the fixed spindle carrier, the other end is placed in alinement with the socket in the other carrier and the base, standard and bearing head are moved inward until the end of the spindle closely engages the socket in the carrier. It is obvious that the ends of the spindle must engage the sockets in the carriers closely and on the other hand that the shoulders on the carriers must not be forced inward upon the balls tightly enough to interfere with the free rotation of the carriers.

It will be noted that the bearings are perpetually self-adjusting to compensate for the wear of use, for the reason that each time a spindle is inserted the loose bearing is moved inward far enough to cause both ends of the spindle to engage the sockets in the carriers closely and to set the shoulders on the carriers in proper relation to the balls. This is a matter that becomes quickly apparent even to an unskilled workman.

Having thus described my invention, I claim:

The combination with a bearing head having a socket, of a rotary spindle carrier in said socket having shoulders, blocks in said socket facing the shoulders, balls between the shoulders and the blocks, a collar secured to the spindle to prevent the outer block from detachment when the carrier is removed and a screw passing through the inner block and engaging the end of the carrier to retain said inner block against detachment when the carrier is removed.

In testimony whereof I affix my signature, in presence of two witnesses.

HENRY V. SMITH.

Witnesses:
  GEO. P. URIG,
  WALTER H. BULLARD.